United States Patent
Oesterling et al.

(10) Patent No.: US 7,548,744 B2
(45) Date of Patent: Jun. 16, 2009

(54) WIFI AUTHENTICATION METHOD

(75) Inventors: Christopher L. Oesterling, Troy, MI (US); Dwayne A. Crocker, Oxford, MI (US)

(73) Assignee: General Motors Corporation, Detroit, MI (US)

( * ) Notice: Subject to any disclaimer, the term of this patent is extended or adjusted under 35 U.S.C. 154(b) by 57 days.

(21) Appl. No.: 10/740,877

(22) Filed: Dec. 19, 2003

(65) Prior Publication Data
US 2005/0136892 A1    Jun. 23, 2005

(51) Int. Cl.
*H04M 3/16*    (2006.01)

(52) U.S. Cl. ............... 455/411; 455/410; 455/466; 455/456.1; 455/422.1; 455/435.1; 455/414

(58) Field of Classification Search ............... 455/420, 455/410, 411, 555, 466, 456.1, 422.1, 435.1, 455/414
See application file for complete search history.

(56) References Cited

U.S. PATENT DOCUMENTS

| | | | | |
|---|---|---|---|---|
| 6,662,014 B1 * | 12/2003 | Walsh | ............... | 455/456.2 |
| 6,745,326 B1 * | 6/2004 | Wary | ............... | 713/168 |
| 6,895,240 B2 * | 5/2005 | Laursen et al. | ............... | 455/420 |
| 6,970,703 B2 * | 11/2005 | Fuchs et al. | ............... | 455/426.1 |
| 7,277,547 B1 * | 10/2007 | Delker et al. | ............... | 380/270 |
| 7,313,381 B1 * | 12/2007 | Lemilainen et al. | ............... | 455/405 |
| 2001/0044296 A1 * | 11/2001 | Mizikovsky | ............... | 455/411 |
| 2002/0010786 A1 * | 1/2002 | Brandes et al. | ............... | 709/229 |
| 2002/0025781 A1 * | 2/2002 | Saito | ............... | 455/41 |
| 2002/0165789 A1 * | 11/2002 | Dudek et al. | ............... | 705/26 |
| 2003/0103482 A1 * | 6/2003 | Van Bosch | ............... | 370/338 |
| 2003/0109972 A1 * | 6/2003 | Tak | ............... | 701/29 |
| 2003/0115460 A1 * | 6/2003 | Arai | ............... | 713/168 |
| 2004/0068653 A1 * | 4/2004 | Fascenda | ............... | 713/168 |
| 2004/0168081 A1 * | 8/2004 | Ladas et al. | ............... | 713/201 |
| 2004/0176071 A1 * | 9/2004 | Gehrmann et al. | ............... | 455/411 |
| 2004/0185842 A1 * | 9/2004 | Spaur et al. | ............... | 455/420 |
| 2004/0214597 A1 * | 10/2004 | Suryanarayana et al. | . | 455/552.1 |
| 2005/0064853 A1 * | 3/2005 | Radpour | ............... | 455/414.4 |

* cited by examiner

*Primary Examiner*—Charles N Appiah
*Assistant Examiner*—Kwasi Karikari

(57) ABSTRACT

A system and method provides secure authentication of a wireless communication channel for a vehicle telematics device that includes detecting a wireless access point within radio range of a telematics device, requesting authentication information for the access point through a first secure communication channel to a call center, receiving authentication information for the wireless access point from the call center through the first secure communication channel, and providing authentication information for the telematics device to the wireless access point through a second secure communication channel. A computer readable medium storing a computer program is described for implementing one or more steps of the method.

9 Claims, 3 Drawing Sheets

WIFI AUTHENTICATION METHOD

FIELD OF THE INVENTION

The invention relates to vehicle communication systems, and more particularly to methods and systems for providing secure authentication of a wireless communication channel for a vehicle telematics device.

BACKGROUND OF THE INVENTION

Many passenger vehicles now incorporate an integrated communication system. A Vehicle Communication Unit (VCU) used in conjunction with a Wide Area Network (WAN) such as a cellular telephone network or a satellite communication system, allows for a variety of fee-based subscription services to be provided in a mobile environment. The VCU is typically a vehicle telematics device including a cellular radio, a satellite receiver and/or transmitter, a so-called WIFI wireless access point transceiver adhering to IEEE 802.11 or similar wireless communication standards, and global positioning capabilities. Communication through a carrier service may be initiated at the VCU via button press or through voice command phone number entry. In other applications, a radio communication link is established between the VCU and a node of a wireless LAN or WAN in the vicinity of the VCU to provide an additional communications channel through a wireless modem.

In order to initiate a wireless communications channel based on the IEEE 802.11 (WIFI) standard, communication protocol information must be exchanged between a vehicle telematics device and a wireless access point (WAP). For example, a wireless access point (WAP) requires authentication information from the telematics device such as a Media Access Control (MAC) address of the telematics device. In addition, the vehicle telematics device requires information form the wireless access point such as a wired equivalent protocol (WEP) key. The devices must exchange the authentication protocol data before a communication channel may be opened between the devices. However, simply broadcasting the authentication data between the devices is not secure, and other devices within radio range could potentially intercept the transmissions and obtain access or identity information to a vehicle telematics device or a wireless access point that is desired to remain private.

It would be desirable therefore to provide a method and system for providing a secure authentication of a wireless communication channel for a vehicle telematics device that overcomes these and other disadvantages.

SUMMARY OF THE INVENTION

The present invention is directed to a method for providing secure authentication of a wireless communication channel for a vehicle telematics device that includes detecting a wireless access point within radio range of a telematics device, requesting authentication information for the access point through a first secure communication channel to a call center, receiving authentication information for the wireless access point from the call center through the first secure communication channel, and providing authentication information for the telematics device to the wireless access point through a second secure communication channel.

In accordance with yet another aspect of the invention a computer readable medium includes computer code for instructing a telematics device to detect a wireless access point within radio range of the telematics device, computer readable code for requesting authentication information for the access point through a first secure communication channel to a call center, computer readable code for directing the communication of authentication information for the wireless access point from the call center through the first secure communication channel, and computer readable code for providing authentication information for the telematics device to the wireless access point through a second secure communication channel.

In accordance with still another aspect of the invention, a system for providing secure authentication of a wireless communication channel for a vehicle telematics device describes means for detecting a wireless access point within radio range of a telematics device, means for requesting authentication information for the access point through a first secure communication channel to a call center, means for receiving authentication information for the wireless access point from the call center through the first secure communication channel; and means for providing authentication information for the telematics device to the wireless access point through a second secure communication channel.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
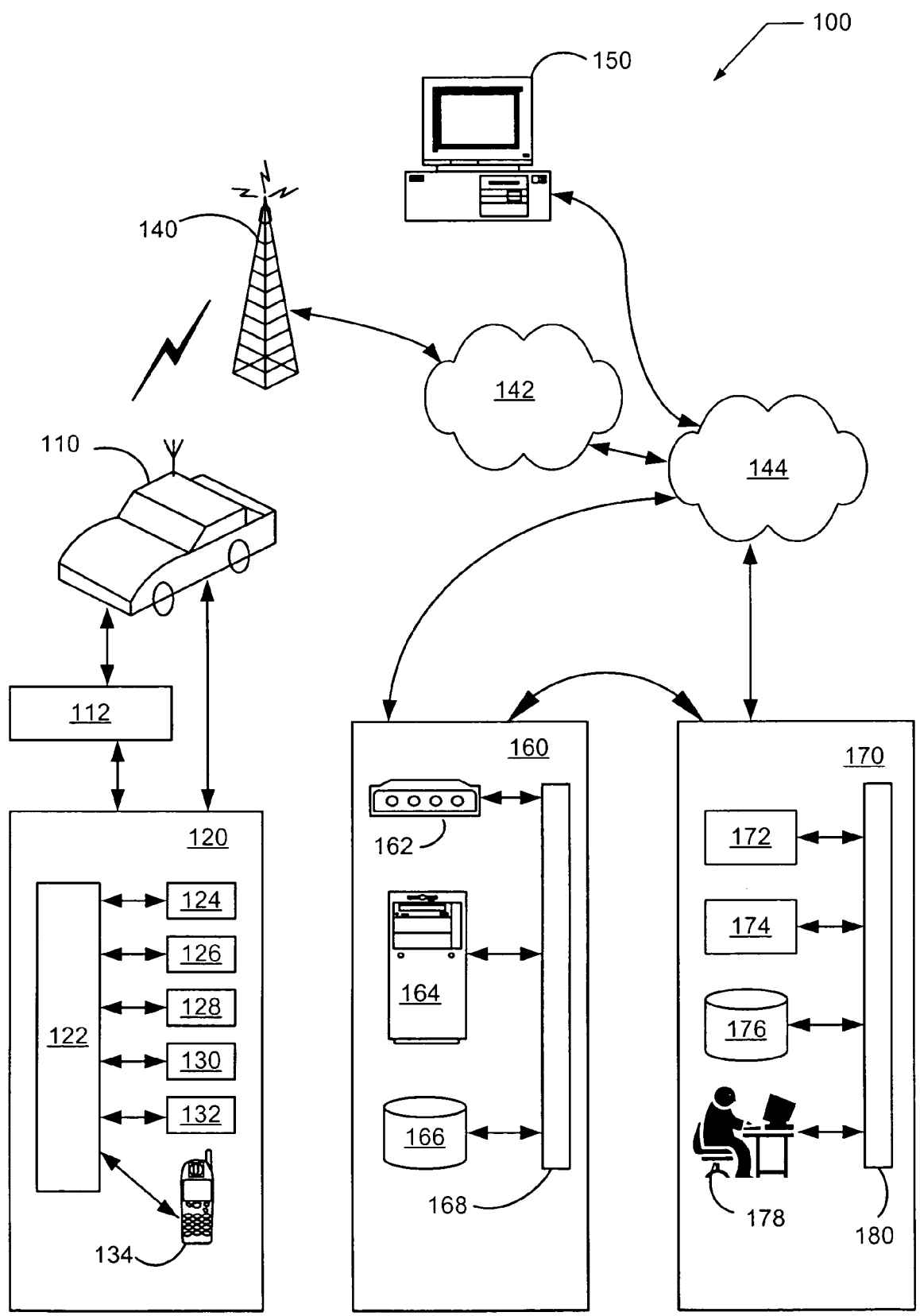
FIG. 1 is an illustrative operating environment for one embodiment of the present invention.

FIG. 1 is an illustrative operating environment for a vehicle telematics system in an embodiment of the present invention. FIG. 1 shows a mobile vehicle communication system 100. Mobile vehicle communication system 100 includes at least one mobile vehicle 110 (vehicle) including vehicle communication bus 112 and vehicle communications unit (VCU) 120, one or more wireless carrier systems 140, one or more communication networks 142, one or more land networks 144, one or more client, personal or user computers 150, one or more web-hosting portals 160, and one or more call centers 170. In one embodiment, mobile vehicle 110 is implemented as a vehicle equipped with suitable hardware and software for transmitting and receiving voice and data communications through one or more communications channels.

In one embodiment, vehicle communications unit 120 is a telematics device that includes a digital signal processor (DSP) 122 connected to a wireless modem 124, a global positioning system (GPS) unit 126, an in-vehicle memory 128, such as, for example, a non-volatile flash memory, a microphone 130, one or more speakers 132, and an embedded or in-vehicle mobile phone 134. In one embodiment, DSP 122 is a microcontroller, controller, host processor, or vehicle communications processor. In an example, DSP 122 is implemented as an application specific integrated circuit (ASIC). GPS unit 126 provides longitude and latitude coordinates of the vehicle. In-vehicle mobile telephone system 134 is a cellular-type phone, such as, for example an analog, digital, dual-mode, dual-band, multi-mode or multi-band cellular phone. In another example, the mobile telephone system is an analog mobile telephone system operating over a prescribed band nominally at 800 MHz. In yet another example, the mobile telephone system is a digital mobile telephone system operating over a prescribed band nominally at 800 MHz, 900 MHz, 1900 MHz, or any suitable band capable of carrying digital cellular communications.

DSP 122 executes various computer programs and communication control and protocol algorithms that control communication, programming and operational modes of electronic and mechanical systems within vehicle 110. In one embodiment, DSP 122 is an embedded system controller. In another embodiment, DSP 122 controls communications between telematics device 120, wireless carrier system 140, and call center 170. In another embodiment, DSP 122 controls communications between the wireless modem 124 and one or more wireless access points within the radio range of the telematics device 120. In one embodiment, a voice-recognition application is installed in DSP 122 to translate human voice input through microphone 130 into digital signals. DSP 122 generates and accepts digital signals transmitted between telematics device 120 and a vehicle communication bus 112 that is connected to various electronic modules in the vehicle 110. In one embodiment, the digital signals activate a programming mode and operation modes, as well as provide for data transfers. In another embodiment, a vehicle data upload (VDU) utility program facilitates the transfer of instructions and data requests to vehicle 110 and field service software update data.

Wireless modem 124 is any wireless modem device incorporating software and hardware for providing wireless data communication between other suitable devices. In an embodiment, wireless modem 124 is a wireless transceiver compliant with the IEEE 802.11 protocols for operation with wireless access points and other compatible wireless nodes. In another embodiment, modem 124 is compliant with the Bluetooth standard.

Mobile vehicle 110, via a vehicle communication bus 112, sends signals to various modules and systems within vehicle 110 to perform various functions such as monitoring the operational state of vehicle systems, collecting and storing data from the vehicle systems, providing instructions, data and programs to various vehicle systems and calling from telematics device 120. In facilitating interactions among the various communication and electronic modules, vehicle communication bus 112 utilizes bus interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication bus 112 is a direct connection between connected devices.

Vehicle 110, via telematics device 120, sends and receives radio transmissions from wireless carrier system 140. Wireless carrier system 140 is implemented as any suitable system for transmitting a signal from mobile vehicle 110 to communication network 142. Wireless carrier system 140 incorporates any type of telecommunications in which electromagnetic waves carry signal over part of or the entire communication path. In one embodiment, wireless carrier system 140 transmits analog audio, video signals, or both. In an example, wireless carrier system 140 transmits analog audio signals, video signals, or digital audio signals in the S band (approved for use in the U.S.) and L band (used in Europe and Canada). In one embodiment, wireless carrier system 140 is a satellite broadcast system broadcasting over a spectrum in the "S" band (2.3 GHz) that has been allocated by the U.S. Federal Communications Commission (FCC) for nationwide broadcasting of satellite-based Digital Audio Radio Service (DARS).

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to mobile vehicle 110 and land network 144. In one example, wireless carrier system 140 includes a short message service, modeled after established protocols such as IS-637 SMS standards, IS-136 air interface standards for SMS, and GSM 03.40 and 09.02 standards. Similar to paging, an SMS communication could be broadcast to a number of regional recipients. In another example, the carrier system 140 uses services in accordance with other standards, such as, for example, IEEE 802.11 compliant wireless systems and Bluetooth compliant wireless systems.

Land network 144 is a public-switched telephone network (PSTN). In one embodiment, land network 144 is implemented as an Internet protocol (IP) network. In other embodiments, land network 144 is implemented as a wired network, an optical network, a fiber network, another wireless network, or any combination thereof. Land network 144 is connected to one or more landline telephones. Land network 144 connects communication network 142 to user computer 150, web-hosting portal 160, and call center 170. Communication network 142 and land network 144 connects wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160 and vehicle 110. In an embodiment, personal or user computer 150 sends vehicle software update requests or field service software update data to web-hosting portal through a web-page interface using communication standards such as hypertext transport protocol (HTTP), and transport-control protocol Internet protocol (TCP/IP). In one embodiment, the data includes directives to change certain programming and operational modes of electronic and mechanical systems within vehicle 110. In another embodiment, the data includes executable code to reprogram certain functions such as operational modes of electronic or mechanical systems within vehicle 110. In operation, a user, such as, for example, a vehicle designer or manufacturing engineer, utilizes user computer 150 to provide requests to perform vehicle software update requests or field service software update data to mobile vehicle 110 that is cached or stored in web-hosting portal 160. In an embodiment, mobile vehicle data from client-side software is transmitted to server-side software of web-hosting portal 160. In one embodiment, vehicle software update request data is stored at web-hosting portal 160. In another embodiment, client computer 150 includes a database (not shown) for storing received field service software update data. In yet another embodiment, a private Local Area Network (LAN) is implemented for client computer 150 and Web hosting portal 160, such that web hosting portal is operated as a Virtual Private Network (VPN). In still another embodiment, web-hosting portal 160 and client 150 represent an auto dealership or vehicle service center that is enabled to directly communicate with a vehicle telematics device through a wireless modem.

Web-hosting portal 160 includes one or more data modems 162, one or more web servers 164, one or more databases 166, and a network 168. Web-hosting portal 160 is connected directly by wire to call center 170, or connected by phone lines to land network 144, which is connected to call center 170. Web-hosting portal 160 is connected to land network 144 by one or more data modems 162. Land network 144 sends digital data to and from modem 162; data that is subsequently transferred to web server 164. In one implementation, modem 162 resides inside web server 164. Land network 144 transmits data communications between web-hosting portal 160 and call center 170.

Web server 164 receives various data, requests or instructions from user computer 150 via land network 144. In alternative embodiments, user computer 150 includes a wireless modem to send data to web-hosting portal 160 through a wireless communication network 142 and a land network 144. Data is received by modem 162, a wired or wireless modem, and sent to one or more web servers 164. In one embodiment, web server 164 is implemented as any suitable hardware and software capable of providing web services to transmit and receive data from user computer 150 to telematics device 120 in vehicle 110. Web server 164 sends to or receives data transmissions from one or more databases 166 via network 168. Web server 164 includes computer applications and files for managing mobile data.

In one embodiment, one or more web servers 164 are networked via network 168 to distribute field service software update data among its network components such as database 166. In an example, database 166 is a part of or a separate computer from web server 164. In one embodiment, web-server 164 sends data transmissions with mobile data to call center 170 via modem 162, and through land network 144.

Call center 170 is a location where many calls are received and serviced at the same time, or where many calls are sent at the same time. In one embodiment, the call center is a telematics call center, facilitating communications to and from telematics device 120 in vehicle 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more networks 180.

Switch 172 of call center 170 connects to land network 144. Switch 172 transmits voice or data transmissions from call center 170, and receives voice or data transmissions from telematics device 120 in mobile vehicle 110 through wireless carrier system 140, communication network 142, and land network 144. Switch 172 receives data transmissions from, and sends data transmissions to, one or more web-hosting portals 160. Switch 172 receives data transmissions from, or sends data transmissions to, one or more communication services managers 174 via one or more networks 180. In one embodiment, switch 172 includes a packet router.

Communication services manager 174 is any suitable hardware and software capable of providing communication services to telematics device 120 in mobile vehicle 110. In an example, communication services manager 174 is a server computer having an operating system and software that supports multiple simultaneous service management functions. Communication services manager 174 sends to or receives data transmissions from one or more communication services databases 176 via network 180. Communication services manager 174 sends to or receives data transmissions from one or more communication services advisors 178 via network 180. Communication services database 176 supplies data to communication services advisor 178 via network 180. Communication services advisor 178 receives from or sends to switch 172 voice or data transmissions.

Communication services manager 174 facilitates one or more services, such as, but not limited to, enrollment services, navigation assistance, directory assistance, roadside assistance, business or residential assistance, information services assistance, emergency assistance, and communications assistance and vehicle software update management services. Communication services manager 174 receives service requests for authentication data from a telematics device 110 for various access points related to mobile communication system 100. Communication services manager 174 accesses authentication data from mobile vehicle 110 and one or more databases 176, and then transmits the authentication data to telematics device 120 in mobile vehicle 110 through wireless carrier system 140, communication network 142, land network 144, voice and data switch 172, and network 180. Communication services manager 174 stores or retrieves authentication data from vehicle 110 and provides the authentication data to a wireless access point through a secure communication channel comprising one or more of communication network 142, land network 144, voice and data switch 172, and network 180. Communication services manager 174 securely provides the requested authentication information to a vehicle telematics device 120 or to a wireless access point to provide a secure authentication between the devices for wireless communication.

In one embodiment, communication services advisor 178 is a real advisor. In another embodiment, communication services advisor 178 is implemented as a virtual advisor. In an example, a real advisor is a human being at service provider service center in verbal communication with service subscriber in mobile vehicle 110 via telematics device 120. In another example, a virtual advisor is implemented as a synthesized voice interface responding to requests from telematics device 120 in mobile vehicle 110. In another embodiment, communication services advisor 178 is embodied in software executing on a computing system, and provides automated secure wireless authentication services, such as between a telematics device 120 and a wireless access point.

Communication services advisor 178 provides services to telematics device 120 in mobile vehicle 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics device 120 in mobile vehicle 110 through wireless carrier system 140, communication network 142, and land network 144 using voice transmissions, or through communication services manager 174 and switch 172 using data transmissions. Switch 172 selects between voice transmissions and data transmissions.

In an embodiment, mobile vehicle 110 initiates a service request to call center 170 by sending a request for authentication information through telematics device 120 which in turn, sends an data signal or a voice call through wireless carrier system 140, communication network 142, and land network 144 to call center 170. In another embodiment, the mobile vehicle 110 receives a request from call center 170 to send various vehicle data from mobile vehicle 110 through telematics device 120, wireless carrier system 140, communication network 142, and land network 144 to call center 170.

Figure 2:
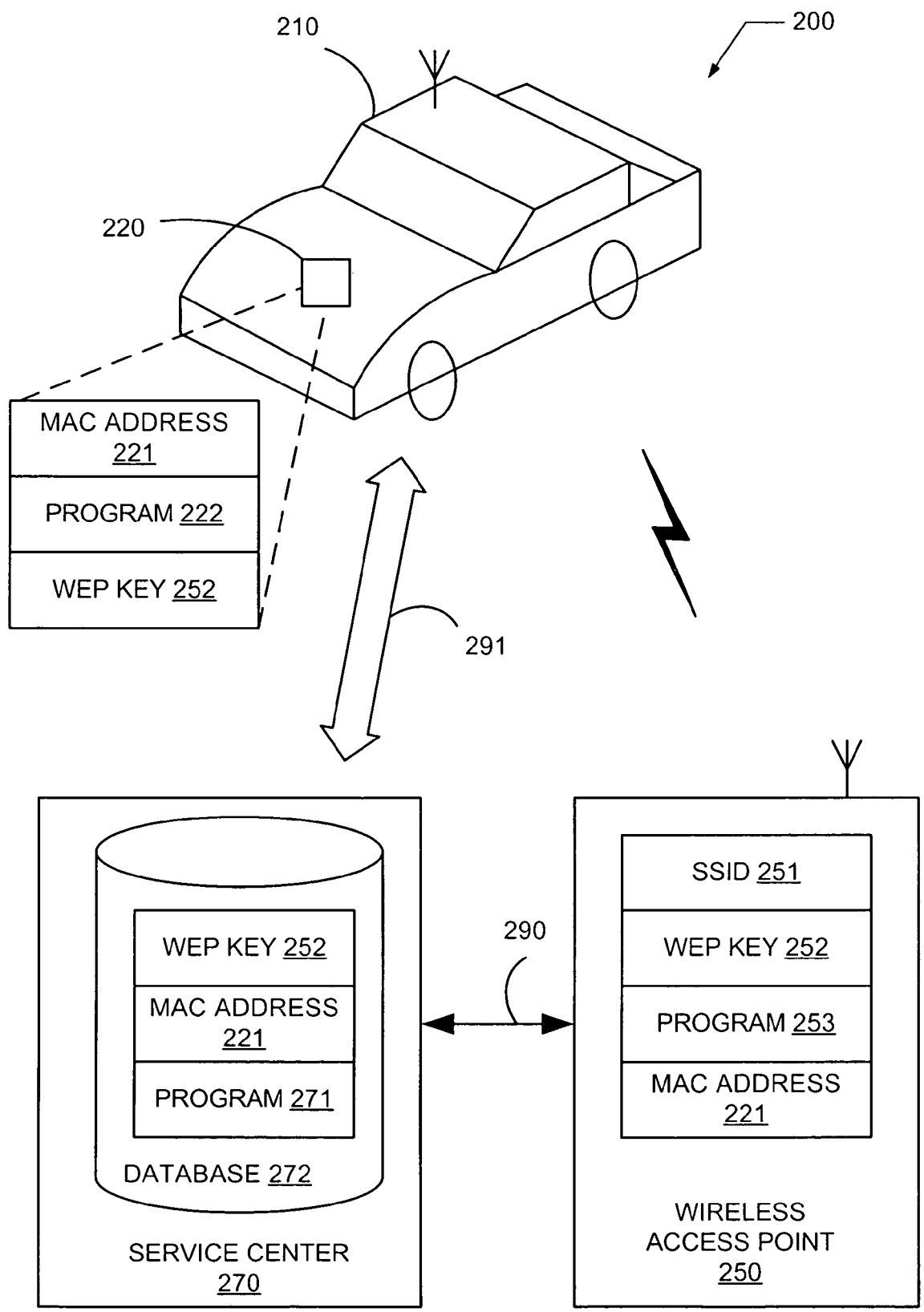
FIG. 2 is a block diagram of a system for providing secure authentication of a wireless communication channel for a vehicle telematics device.

FIG. 2 is a block diagram of a system for providing secure authentication of a wireless communication channel for a vehicle telematics device. FIG. 2 shows an embodiment of a secure channel vehicle telematics authentication system 200 that includes a vehicle 210 having a telematics device 220, a service center 270 and a wireless access point (WAP) 250. The telematics device 220 is shown having stored data that in an embodiment, includes a media access control (MAC) address 221 for the telematics device, a program 222 and a wired equivalent protocol (WEP) key 252 for WAP 250. Wireless access point 250 is also shown having stored data, which in an embodiment includes a service set identifier (SSID) 251 for wireless access point 250, a WEP encryption key 252, a program 253 and MAC address 221 for telematics device 220. The service center 270 is shown having stored data including a database 272 that includes one or more programs 271, one or more WEP keys 252, and one or more MAC address 221 for one or more vehicles 210 and one or more wireless access points 250. In one embodiment, database 272 comprises a master list of WEP keys 252 and MAC addresses 221, in addition to SSIDs for a plurality of vehicles 210 and compatible network wireless access points 250.

In FIG. 2, service center 270 is shown having a direct bidirectional communication channel 290 to wireless access point 250. In an embodiment, the bidirectional communication channel 290 is a land network such as land network 144 of FIG. 1, including a PSTN. In one embodiment, one or more components of mobile vehicle communication system 100 of FIG. 1 enable a bidirectional communication channel 291 between the vehicle telematics device 220 and the service center 270. In another embodiment, the bidirectional data communication channel 291 comprises a data channel of a wireless telephone carrier system for at least a portion of the channel connection.

Mobile vehicle 210 is any telematics enabled vehicle such as, for example, vehicle 110 of FIG. 1. In an embodiment, mobile vehicle 210 includes hardware and software for telematics services.

Telematics device 220 is any telematics device for operation within a mobile vehicle communication system, such as mobile vehicle communication system 100 of FIG. 1. In an embodiment, telematics device 220 is a telematics device such as telematics device 120 of FIG. 1, which incorporates a wireless modem such as wireless modem 124. Telematics device 220 includes volatile and non-volatile memory for storing data and programs. In an embodiment, one or more programs 222 and various communication protocol data such as MAC address 221 of an attached wireless modem, and WEP key 252 for a destination wireless access point 250 are stored at telematics device 220. In an embodiment, telematics device 220 is enabled to communicate data to a compatible wireless node via the integrated wireless modem.

Service center 270 is any telematics subscription service center such as service center 170 of FIG. 1. Service center 270 includes hardware and software for managing service requests and data. In an embodiment, service center 270 includes a master list database 272 including one or more programs 271, and communication protocol data such as MAC address 221 and WEP key 252 for a plurality of vehicles 210 and wireless access points 250 that are part of a servicing network associated with the service provider.

Wireless access point 250 is any wireless modem device for exchanging data between compatible wireless data communication devices. Wireless access point 250 includes volatile and non-volatile memory for storing data and programs. In an embodiment, wireless access point 250 is coupled to one or more computer systems (not shown). In another embodiment, wireless access point 250 includes one or more programs 253, stored data such as SSID 251 and WEP key 252, and data obtained from database 272 such as MAC address 221 of vehicle telematics device 220. In an embodiment, wireless access point 250 is located at an affiliate of service center 270 such as an auto dealer or repair facility that is directly coupled to service center 270 via a direct communication channel 290. Wireless modems generally allow for the transmission of large amounts of data at very high data rates. One application for a wireless modem enabled telematics device is wireless vehicle servicing such as field service software updates.

In operation, telematics device 220 employs components of mobile vehicle communication system 100 to implement a secure channel authentication system 200 for a telematics device incorporating a wireless modem. Telematics device 220 detects a wireless access point within radio range through a probe frame, receiving an SSID broadcast from the WAP or through another equivalent node detection process. After detection of a wireless access point 250, a secured authentication process occurs between the telematics device 220 and the detected wireless access point 250. Components of vehicle communication system 100 such as service center 270 provide one or more secure communication channels for passing authentication data and authentication protocol data such as MAC addresses 221 and WEP keys 252 from a master database 272. In one embodiment, a data channel of a wireless telephone carrier system, such as a code division multiple access (CDMA) packet data connection, is employed for bidirectional data communication between the vehicle telematics device 220 and the service center 270. In another embodiment, service center 270 stores a universal master list of authentication data, such as WEP keys 252, for a plurality of wireless access point nodes affiliated with a service provider network, and MAC address of subscriber wireless-modem-equipped vehicles 210. Upon request from telematics device 220 authentication data, such as WEP key 252, for a detected access point 250 is provided by the service provider 270 through the secure communication channel 291. Similarly, authentication data, such as MAC address 221, for the telematics device 220 is passed to the detected access point 250 from the service center 270 through the direct communication channel 290.

In operation, an authentication process is therefore accomplished without the need to broadcast authentication data in an unsecured manner directly between the telematics device 220 and the wireless access point 250. Once an authentication between telematics device 220 and wireless access point 250 is completed, encrypted data transmission directly between the devices is possible using known encryption protocols such as, for example, wired equivalent protocol (WEP) key systems. Such transfers may include vehicle service codes or data downloads from an auto dealer or repair facility for example, and other proprietary data for a vehicle system or a telematics device.

Figure 3:
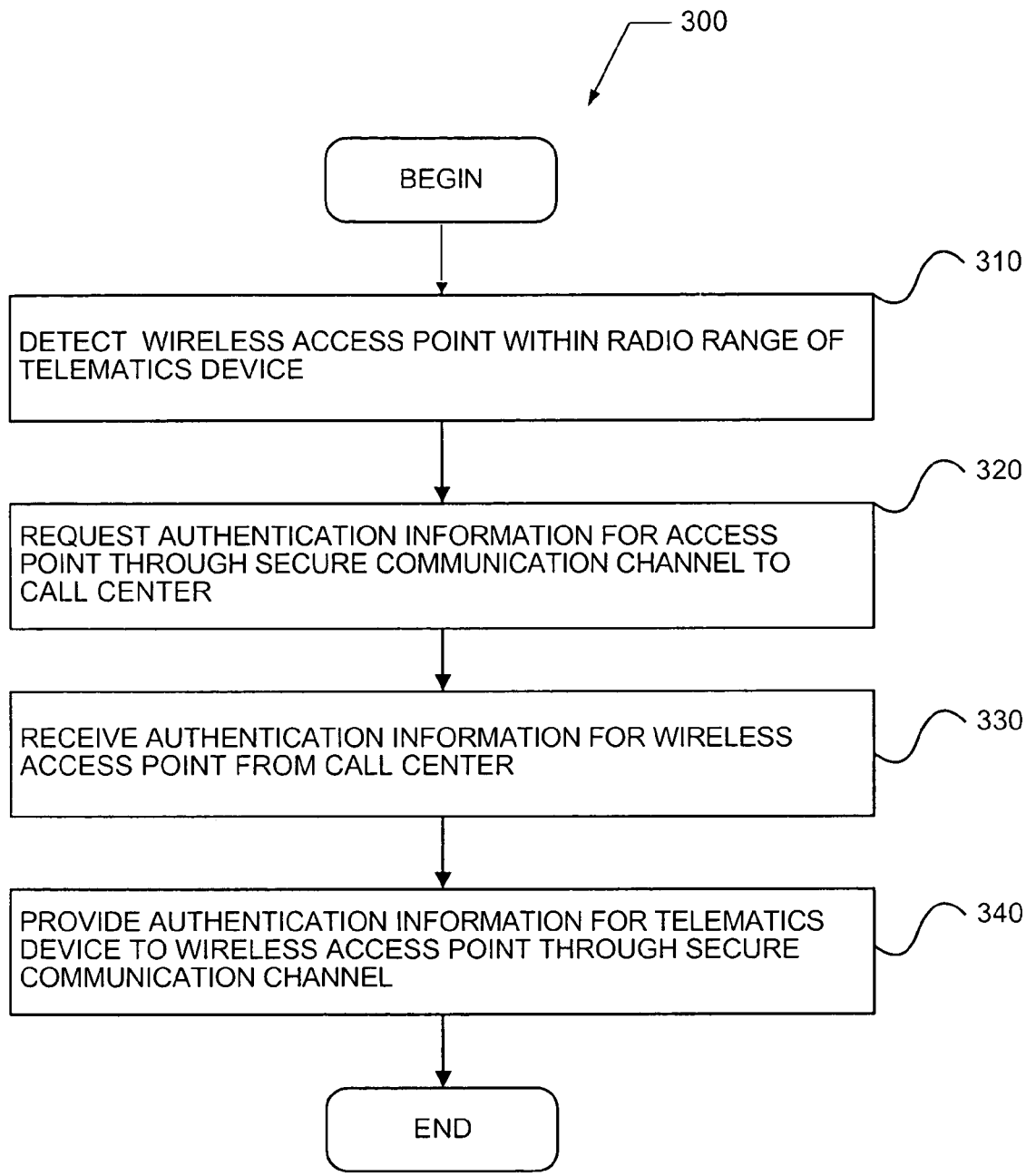
FIG. 3 is a process flow diagram of a method for providing secure authentication of a wireless communication channel for a vehicle telematics device.

FIG. 3 is a process flow diagram of a method for providing secure authentication of a wireless communication channel for a vehicle telematics device. In one embodiment, method 300 is implemented with components of the exemplary systems described with reference to FIGS. 1 and 2. In another embodiment, one or more steps of method 300 are embodied in a computer readable medium storing computer readable code. Method 300 begins in step 310.

In step 310, a wireless access point 250 within radio range of a telematics device 220 is detected. In one embodiment, the detection of a wireless access point 250 occurs at any time that a vehicle 210 is operational within a secure channel vehicle telematics authentication system 200. In an embodiment, detecting the wireless access point 250 includes receiving a service set identifier (SSID) broadcast from the wireless access point 250. In another embodiment, detecting the wireless access point 250 includes broadcasting a service set identifier request from the telematics device 220, receiving the SSID request at the wireless access point 250 and transmitting the SSID for the wireless access point 250 to the telematics device 220 responsive receiving the request.

In step 320, authentication information for the access point 250 is requested from a call center 270 through a first secure communication channel 291. In one embodiment, the request for authentication information occurs at any time after a wireless access point 250 is detected. In another embodiment, the request for authentication information is generated from a telematics device 220 in response to detecting the wireless access point 250. Authentication information is any data that is useful for an authentication process between two wireless access point nodes, as is known in the art. In one embodiment, authentication information includes but is not limited to a WEP key 252, a MAC address 221, a system identification (SID), a mobile identification number (MIN), and an electronic serial number (ESN).

In an embodiment, requesting authentication information for the access point 250 through the first secure communication channel 291 to a call center 270 includes initiating a call from the telematics device 220 to a service center 270 through a carrier system, communicating the request through the carrier system to the call center 270 and wherein the requested authentication information includes a wired equivalent protocol key 252 and wherein a database 272 containing authentication data for the access point is accessed at the service center 270 responsive to the request. In another embodiment, the wireless carrier system provides a packet data connection and the wireless call is a secure data channel when the call is connected.

In step 330, authentication information for the wireless access point 250 is received from the call center through the first secure communication channel. In an embodiment, the authentication information is received at any time after the information is requested. In another embodiment, the received authentication information includes a WEP key 252 for the wireless access point 250 detected in step 310. In yet another embodiment, the authentication information is received to the telematics device 220.

In step 340, authentication information for the telematics device 220 is provided to the wireless access point 250 through a second secure communication channel 290. In one embodiment, the authentication information is provided at any time after the authentication information has been requested. In another embodiment, the authentication information is provided at any time after the authentication information has been received by the telematics device.

In one embodiment, providing authentication information for the telematics device 220 to the wireless access point 250 through a second secure communication channel 290 includes identifying a telephone number for the wireless access point 250 in a database at a service center responsive to the requesting authentication information for the access point, requesting a media access control (MAC) address 221 from the telematics device 220 responsive to the requesting authentication information for the access point 250, initiating a call to the wireless access point 250 from the service center 270 to the telematics device 220 through a carrier system and communicating the media access control address 221 for the telematics device 220 to the wireless access point 250. In another embodiment, the second secure communication channel 290 comprises a dedicated telephone circuit from the wireless access point 250 to the service center 270. In another embodiment, the second secure communication channel 290 comprises a dedicated virtual private network (VPN). In another embodiment, the first secure channel 291 is a wireless carrier system 140. In yet another embodiment, the second secure channel is a PSTN land line 144.

Another embodiment includes communicating data directly between the telematics device 220 and the wireless access point 250 subsequent to an authentication between the detected wireless access point 250 and the telematics device 220. In an embodiment, the wireless access point 250 is coupled to a computer or network system of an affiliate of the service provider 270 such as, for example, an auto dealership or repair facility.

It is anticipated that the invention will be embodied in other specific forms not described that do not depart from its spirit or essential characteristics. The described embodiments are to be considered in all respects only as illustrative and not restrictive.

We claim:

1. A method for providing secure authentication of a wireless communication channel, comprising the steps:
   (a) detecting a wireless access point with a vehicle telematics units wherein the vehicle telematics unit is located in a vehicle that can be driven in and out of radio range of the wireless access point;
   (b) requesting authentication information regarding the wireless access point from a call center, wherein the request is made by the vehicle telematics unit over a first secure communication channel established between the vehicle telematics unit and the call center;
   (c) providing authentication information regarding the wireless access point to the vehicle telematics unit, wherein the information is provided by the call center over the first secure communication channel;
   (d) providing authentication information regarding the vehicle telematics unit to the wireless access point, wherein the information is provided by the call center over a second secure communication channel established between the call center and the wireless access point, and;
   (e) utilizing both the authentication information regarding the vehicle telematics unit and that regarding the wireless access point to establish a third secure communication channel between the vehicle telematics unit and the wireless access point.

2. The method of claim 1, wherein the first secure communication channel is a wireless cellular channel maintained by a wireless carrier system.

3. The method of claim 2, wherein the first secure communication channel provides for packet data connections so that the wireless cellular channel is a secure data channel when the request for authentication information in step (b) is made.

4. The method of claim 1, wherein the second secure communication channel is a wireline channel maintained by a land network.

5. The method of claim 1, wherein the third secure communication channel is a wireless radio channel maintained by a wireless network that is in compliance with IEEE 802.11 protocols.

6. The method of claim 1, wherein the authentication information of step (c) comprises a wired equivalent protocol key.

7. The method of claim 1, wherein the authentication information of step (c) is stored in a database located at the call center.

8. The method of claim 1, wherein step (d) further comprises the steps:
- identifying a service set identifier pertaining to the wireless access point in a database at the call center in response to the request of step (b);
- requesting a media access control address from the vehicle telematics device in response to the request of step (b), and;
- providing the media access control address to the wireless access point in step (d).

9. A method for providing secure authentication of a wireless communication channel, comprising the steps:
- (a) detecting a wireless access point that is within radio range of a vehicle telematics unit, wherein the wireless access point is located at a vehicle dealership or a vehicle repair facility;
- (b) requesting authentication information regarding the wireless access point from a call center, wherein the request is made by the vehicle telematics unit over a first secure communication channel that is already established over a cellular connection between the vehicle telematics unit and the call center;
- (c) providing authentication information regarding the wireless access point to the vehicle telematics unit, wherein the information is provided by the call center over the first secure communication channel;
- (d) providing authentication information regarding the vehicle telematics unit to the wireless access point, wherein the information is provided by the call center over a second secure communication channel established between the call center and the vehicle dealership or the vehicle repair facility, and;
- (e) utilizing both the authentication information regarding the vehicle telematics unit and that regarding the wireless access point to establish a third secure communication channel between the vehicle telematics unit and the wireless access point.

* * * * *